(12) United States Patent
Muenich et al.

(10) Patent No.: US 8,187,106 B2
(45) Date of Patent: May 29, 2012

(54) COUPLING DEVICE

(75) Inventors: Marc-Anton Muenich, Gross Glienicke (DE); Karsten Voigtlaender, Duesseldorf (DE); Michael Vierkoetter, Troisdorf (DE)

(73) Assignee: Pierburg GmbH, Neuss (DE)

(*) Notice: Subject to any disclaimer, the term of this patent is extended or adjusted under 35 U.S.C. 154(b) by 300 days.

(21) Appl. No.: 12/445,515

(22) PCT Filed: Aug. 24, 2007

(86) PCT No.: PCT/EP2007/058831
§ 371 (c)(1),
(2), (4) Date: Feb. 10, 2010

(87) PCT Pub. No.: WO2008/043600
PCT Pub. Date: Apr. 17, 2008

(65) Prior Publication Data
US 2010/0144452 A1    Jun. 10, 2010

(30) Foreign Application Priority Data

Oct. 14, 2006   (DE) .......................... 10 2006 048 678

(51) Int. Cl.
*F16D 3/04* (2006.01)
(52) U.S. Cl. ...................................... 464/105
(58) Field of Classification Search ............ 464/75, 464/102, 104, 105, 119, 123–126
See application file for complete search history.

(56) References Cited

U.S. PATENT DOCUMENTS

| 1,459,035 | A |   | 6/1923  | Raisig    |           |
|-----------|---|---|---------|-----------|-----------|
| 1,501,647 | A |   | 7/1924  | Campbell  |           |
| 1,861,365 | A | * | 5/1932  | Schreck   | 464/104 X |
| 2,386,754 | A | * | 10/1945 | Snyder    | 464/124 X |
| 2,488,769 | A |   | 11/1949 | Engstrom  |           |

FOREIGN PATENT DOCUMENTS

| DD | 214905     | 10/1984 |
| DE | 2049625    | 4/1972  |
| DE | 60304954   | 11/2006 |
| EP | 1452759    | 9/2004  |
| JP | 2005083443 | 3/2005  |
| WO | WO-9309358 | 5/1993  |
| WO | WO-0131216 | 5/2001  |

* cited by examiner

*Primary Examiner* — Gregory Binda
(74) *Attorney, Agent, or Firm* — Norman B. Thot

(57) ABSTRACT

A coupling device for transmitting a torque from a first shaft to a second shaft. The coupling device includes the first shaft with a first end section having radially opposite, radially extending projections and/or recesses. The second shaft has a second end section with radially opposite, radially extending projections and/or recesses. The first shaft is axially opposite the second shaft. The coupling device includes a coupling member having coupling projections and/or recesses, wherein the projections and/or recesses of the first and second end sections are respectively configured to engage with at least one of the coupling projections and/or recesses. The coupling projections and/or recesses corresponding to the first end section are arranged at a displacement of about 90° relative to the coupling projections and/or recesses corresponding to the second end section and the coupling member at least partially surrounds the first and second end sections. The first and second sections are disposed axially directly opposite to each other, and the coupling member is positionally fixed by the first and second end sections.

9 Claims, 1 Drawing Sheet

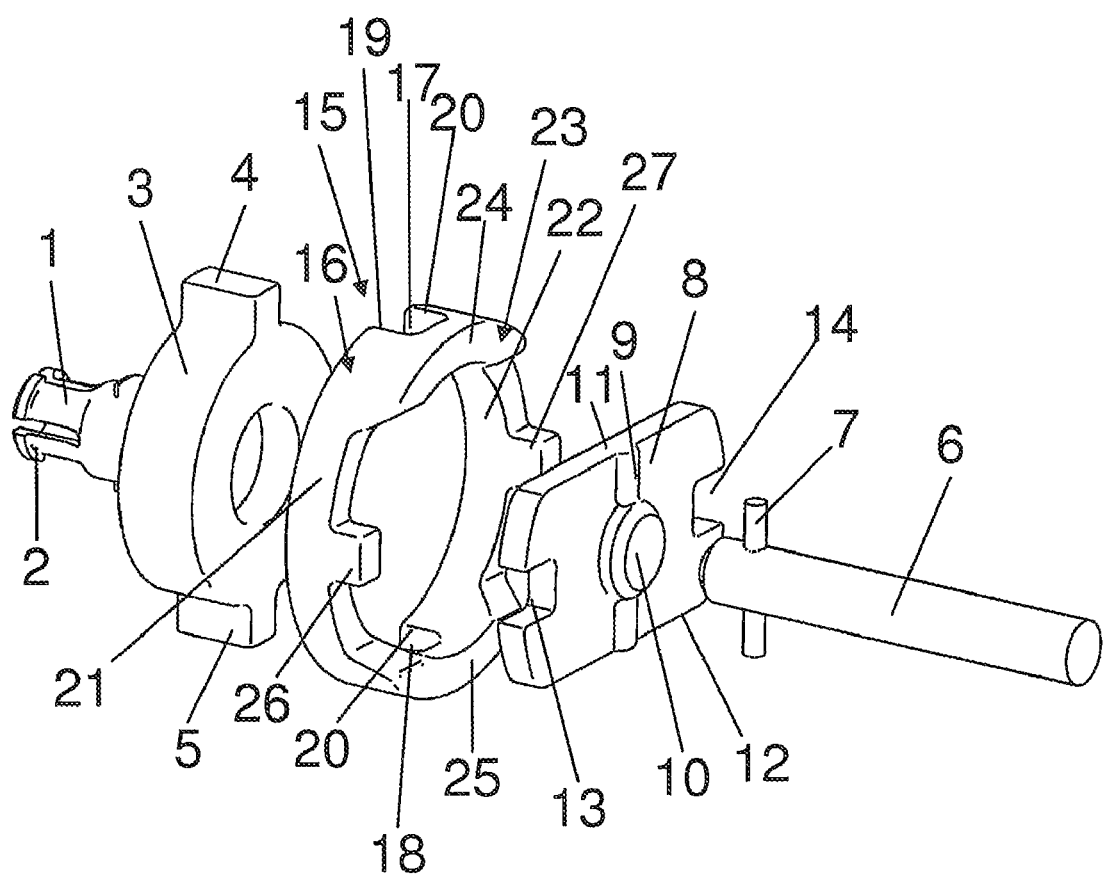

COUPLING DEVICE

CROSS REFERENCE TO PRIOR APPLICATIONS

This application is a U.S National Phase application under 35 U.S.C. §371 of International Application No. PCT/EP2007/058831, filed on Aug. 24, 2007 and which claims benefit to German Patent Application No. 10 2006 048 678.1, filed on Oct. 14, 2006. The International Application was published in German on Apr. 17, 2008 as WO 2008/043600 A1 under PCT Article 21(2).

BACKGROUND

The invention relates to a coupling device for transmission of a torque from a first shaft to an axially opposite second shaft, the shafts being provided with end sections having radially opposite, radially extending projections and/or recesses formed thereon, said projections and/or recesses being arranged in engagement with projections and/or recesses of a coupling member, wherein the recesses or projections of the coupling member which correspond to the end section arranged on the first shaft are arranged at a displacement of substantially 90° relative to the recesses or projections of the which correspond to the end section arranged on the second shaft.

Field

Coupling devices of this type, referred to under the terms "Oldham coupling" or "double-loop transmission", are generally known and have been described in a large number of patent applications. These coupling devices are known e.g. from the automobile sector where they are used in order to couple an output shaft of an actuator device to an adjustable shaft which is provided for adjustment of flaps, for instance.

JP 2005083443 A describes various versions of such coupling devices. In the original embodiment of these coupling devices, the end sections of the shafts comprise radial projections extending along the whole diameter. Corresponding recesses are formed in a coupling member located between said two shaft end sections, with the recesses arranged at angles of 90° relative to each other. Such an embodiment makes it possible to easily compensate for axial and radial displacements between two shafts.

JP 2005083443 A also describes embodiments wherein the shaft sections are formed with radial recesses and projections, respectively. With interposition of a suitably configured coupling member having corresponding axial projections, there is provided a coupling connection to the end sections of the shafts.

The known embodiments suffer, however, from the disadvantage that, in the nowadays extremely restricted space conditions in the region of the engine of an automobile, the required installation space for accommodating such a coupling member will often not be available.

SUMMARY

An aspect of the present invention is to provide a coupling device wherein the required installation space is reduced in comparison to known embodiments and wherein, further, possible axial and radial displacement of the shafts relative to each other is reliably compensated for.

In an embodiment, the present invention provides for a coupling device for transmitting a torque from a first shaft to a second shaft. The coupling device includes the first shaft with a first end section having radially opposite, radially extending projections and/or recesses. The second shaft has a second end section with radially opposite, radially extending projections and/or recesses. The first shaft is axially opposite the second shaft. The coupling device includes a coupling member having coupling projections and/or recesses, wherein the projections and/or recesses of the first and second end sections are respectively configured to engage with at least one of the coupling projections and/or recesses. The coupling projections and/or recesses corresponding to the first end section are arranged at a displacement of about 90° relative to the coupling projections and/or recesses corresponding to the second end section and the coupling member at least partially surrounds the first and second end sections. The first and second sections are disposed axially directly opposite to each other, and the coupling member is positionally fixed by the first and second end sections.

The coupling member at least partially surrounds the end sections arranged on the shafts, and that the end sections arranged on the two shafts are arranged axially directly opposite to each other. Thus, the installation length required for an interposed coupling member which had been provided in known embodiments, is avoided, thus reducing the overall installation space required in the axial direction.

BRIEF DESCRIPTION OF THE DRAWINGS

The present invention is described in greater detail below on the basis of embodiments and of the drawing in which:

The FIGURE shows an exploded perspective view of a coupling device according to the invention.

DETAILED DESCRIPTION

In an embodiment, the end section 3 arranged on the first shaft 1 comprises radially outward projections 4,5, and the end section 8 arranged on the second shaft 6 comprises radially inward recesses 13,14, the coupling member 15 being positionally fixed in the direction towards the first shaft 1 by the projections 4,5 of the end section 3 arranged on the first shaft 1 and, in the direction towards the second shaft 6, being in portion-wise abutment with the end section 8 arranged on the second shaft 6.

Between the projections 4,5, a first axial section 16 of the coupling member 15 can, for example, surround the end section 3 arranged on the first shaft 1 and, in the region of the projections 4,5 of the end section 3, said first axial section 16 can be provided with recesses 17,18, and the first axial section 16 of the coupling member 15 can be joined by a second axial section 23 in the direction towards the second shaft 6, said second axial section 23 consisting of four projections 24,25, 26,27, two of said projections 26,27 engaging the recesses 13,14 of the end section 8 arranged on the second shaft 6 and two of said projections 24,25 connecting to each other the peripheral ends 19,20, separated by the recesses 17,18, of the first axial section 16 and partially surrounding the end section 8 of the second shaft 6.

By such a configuration of the coupling member 15, the coupling member 15 can be produced in an inexpensive manner by injection molding while, further, there is obtained a sufficient strength for transmission of the torque. Due to the omission of superfluous additional surfaces, the weight of such a coupling can also be very low.

In an embodiment, the coupling member 15 can have a substantially annular shape, the inner diameter of the coupling member 15 being larger than an outer diameter of the end section 3 arranged on the first shaft 1, which can be substantially cylindrical. The coupling member 15 can thus serve as a surrounding member for the end section 3 of the first shaft 1, while the demands to the manufacturing tolerances are very low and a slight axial displacement of the shafts can easily be compensated for. Such shapes can further be easily produced.

In an embodiment, the end section 8 of the second shaft 6, when viewed in cross section, can be shaped as a portion of a circle and can have a diameter larger than the inner diameter of the coupling member 15, wherein said portion of a circle can be formed by two parallel linear cut edges arranged opposite to the center of the end section of the second shaft and wherein the recesses 13,14 can be formed in the region of the outer surface of the circle. In this manner, also the end section 8 of the second shaft 6 can be produced in a very simple and inexpensive manner, and an abutment of the annular coupling member 15 can be easily realized.

The end sections 3,8 of the shafts 4,6 can be formed integral with the shaft or a shaft butt, or they can be provided as a separate component fixedly connected to the shaft.

By the above-described embodiments, there is created a coupling device which can be produced in a simple and inexpensive manner while also the required axial installation space is reduced. The torque transmission can thus be completely distributed over the peripheral region of the end sections arranged on the shafts.

The coupling device of the present invention illustrated in the FIGURE comprises a first shaft 1 which in the present embodiment is formed as shaft butt which can be connected, via a clip connection, e.g. to a correspondingly shaped output shaft of an actuator device.

Shaft 1 comprises an end section 3 which in comparison to the shaft diameter is distinctly widened and which comprises two radial outward projections 4,5. Except for said projections, said end section 3 is shaped as a short cylindrical body. Arranged substantially opposite to the first shaft 1 is a second shaft 6, which has a pin 7 radially extending therethrough for establishing a connection to an end section 8 for common rotation therewith. A groove 9, corresponding to pin 7, and a throughgoing hole 10 are provided for attachment of the second shaft 6 to the end section 8. Of course, it would also be possible to produce the shaft integrally with said second end section 8 or to injection-mold the end section 8 directly to the shaft 6. Further, also other form-closed connections for torque transmission are possible from end section 8 to shaft 6, e.g. via a knurled configuration or a polygonal profile. Shaft 8 can be formed e.g. as a valve shaft and serve for driving various valve bodies.

End section 8 has a cross section formed as a portion of a circle, with cut edges 11,12 being formed parallel to each other on opposite sides of said throughgoing hole 10 and respectively of the center of the circle. On end section 8, radially inward recesses 13,14 are formed in the region of the outer diameter at a displacement of 90° relative to said cut edges 11,12.

To connect the end sections 3,8 and, respectively, the first shaft 1 to the second shaft 6 for common rotation therewith, use is made of a coupling member 15. Said coupling member 15 comprises a first axial section 16 which has a substantially annular shape and an inner diameter larger than the outer diameter of the end section 3 of first shaft 1, so that, in the assembled condition, said first axial section 16 of the coupling member surrounds the end section 3 of first shaft 1. For this purpose, the first axial section 16 of coupling member 15 comprises two recesses 17,18 which are interrupted by the annular shape of coupling member 15 so that peripheral end portions 19,20 are arranged on both sides of said recesses 17,18. Thus, the first axial section 16 substantially consists of two opposite ring segments 21,22 which are connected to each other by a second axial section 23 following the first axial section 16 in the direction towards the second shaft 6. It is to be noted that the two axial sections 16,23 can be produced as one piece.

The second axial section 23 substantially consists of four projections 24,25, 26,27 extending in the axial direction and again being shaped as portions of a ring, wherein two projections 24,25 connecting both ring segments 21,22 have a suitable peripheral length for lending sufficient stability to coupling member 15. The two other projections 26,27 serve as a coupling device to couple with the end section 8 of second shaft 6 and are shaped to engage the recesses 13,14 of end section 8. The connecting projections 24,25 are thus arranged in the region of the cut-out circle segments of end section 18 beyond the cut edges 11 and 12 so that, in the assembled condition, the second axial section 23 is arranged substantially around the end section 8 of second shaft 6.

That region of the first axial section 16 of coupling member 15 which is facing towards the second shaft 6 and which has none of said projections 24,25,26,27 formed thereon, is arranged in abutment on that axial end of the end section 8 arranged on second shaft 6 which is facing towards the first shaft so that the coupling member 15 is axially fixed by the projections 4,5 and the radially outward region of end section 8. The outer diameter of the circle segment of the second end section substantially corresponds to the outer diameter of coupling member 15.

The projections 26,27 transmitting the torque are arranged—as known from Oldham couplings—at a displacement of about 90° relative to the recesses 17,18 of coupling member 15, thus preventing the end sections 3,8 from sliding out of place relative to each other.

When the first shaft 1 and thus the end section 3 is rotated, the projections 4,5 will be operative to transmit the rotary movement via the recesses 17,18 to the coupling member 15. By the projections 26,27, this rotary movement will in turn be transmitted via the recesses 13,14 to the end section 8 and thus to the second shaft 6.

It is evident that, in such a configuration, the two end sections 3 and 8 are arranged directly opposite to each other in the axial direction without interposition of a part of the coupling member 15, so that the axial installation length can be considerably reduced in comparison with known embodiments. By such a coupling, a slight axial or radial displacement of the shafts 1 and 6 relative to each other will be compensated for, as is also the case in other Oldham couplings, so that no manufacturing tolerances need be observed which might cause additional costs.

It should be clear that, within the scope of the invention, changes can be made in the technical design, particularly with regard to the exact shapes of the two end sections 3,8 of the shafts but also of the coupling member 15, while the direct positions of the two end sections 3,8 without interposed components must be maintained, as provided by the invention.

The invention claimed is:

1. A coupling device for transmitting a torque from a first shaft to a second shaft, the coupling device comprising:
    the first shaft with a first end section having radially opposite, radially extending outward projections;
    the second shaft with a second end section having radially opposite, radially inward recesses, wherein the first shaft is axially opposite the second shaft; and
    a coupling member having coupling projections and/or recesses, wherein the projections and/or recesses of the first and second end sections are respectively configured to engage with at least one of the coupling projections and/or recesses, wherein the coupling projections and/or recesses corresponding: to the first end section are arranged at a displacement of about 90° relative to the coupling projections and/or recesses corresponding to the second end section and the coupling member at least partially surrounds the first and second end sections, and wherein the first and second end sections are disposed axially directly opposite to each other, and the coupling member is positionally fixed by the first and second end sections; and wherein a first side of the coupling member facing the first shaft is positionally fixed by the projections of the first end section, and a second side of the coupling member facing the second shaft is at least partially positionally fixed by abutting the second end section.

2. The coupling device as recited in claim 1, wherein a first axial coupling section of the coupling member disposed between projections of the first end section surrounds the first end section and the first axial coupling section includes recesses in a region of the projections of the first end section, and wherein the first axial coupling section includes a second axial section facing the second shaft, said second axial coupling section having four projections, with two of the four projections engaging recesses of the second end section and a further two of the four projections connecting peripheral end portions, separated by recesses of the first axial coupling section and partially surrounding the second end section.

3. The coupling device as recited in claim 1, wherein a first axial coupling section of the coupling member disposed between projections of the first end section surrounds the first end section and the first axial coupling section includes recesses in a region of the projections of the first end section, and wherein the first axial coupling section includes a second axial section facing the second shaft, said second axial coupling section having four projections, with two of the four projections engaging recesses of the second end section and a further two of the four projections connecting peripheral end portions, separated by projections of the first axial coupling section, and partially surrounding the second end section.

4. The coupling device as recited in claim 1, wherein the coupling member has a substantially annular shape with an inner diameter of the coupling member being larger than an outer diameter of the first end section, the first end section being substantially cylindrical.

5. The coupling device as recited in claim 4, wherein a cross section of the second end section is shaped as a portion of a circle having a diameter larger than the inner diameter of the coupling member, the portion of a circle being formed by two parallel linear cut edges arranged radially opposite to a center of the second end section and wherein the radially opposite, radially extending projections and/or recesses of the second end section include two recesses in the region of the outer surface of the circle.

6. The coupling device recited in claim 1, wherein the first end section includes radially outward projections, and the second end section includes radially inward recesses, and wherein a first side of the coupling member facing the first shaft is positionally fixed by the projections of the first end section, and a second side of the coupling member facing the second shaft is at least partially positionally fixed by abutting the second end section.

7. The coupling device as recited in claim 1, wherein a first axial coupling section of the coupling member disposed between projections of the first end section surrounds the first end section and the first axial coupling section includes recesses in a region of the projections of the first end section, and wherein the first axial coupling section includes a second axial section facing the second shaft, said second axial coupling section having four projections, with two of the four projections engaging recesses of the second end section and a further two of the four projections connecting peripheral end portions, separated by recesses of the first axial coupling section and partially surrounding the second end section.

8. The coupling device as recited in claim 1, wherein a first axial coupling section of the coupling member disposed between projections of the first end section surrounds the first end section and the first axial coupling section includes recesses in a region of the projections of the first end section, and wherein the first axial coupling section includes a second axial section facing the second shaft, said second axial coupling section having four projections, with two of the four projections engaging recesses of the second end section and a further two of the four projections connecting peripheral end portions, separated by projections of the first axial coupling section, and partially surrounding the second end section.

9. A coupling device for transmitting a torque from a first shaft to a second shaft, the coupling device comprising:

the first shaft with a first end section having radially opposite, radially extending projections and/or recesses;

the second shaft with a second end section having radially opposite, radially extending projections and/or recesses, wherein the first shaft is axially opposite the second shaft; and a coupling member having coupling projections and/or recesses, wherein the projections and/or recesses of the first and second end sections are respectively configured to engage with at least one of the coupling projections and/or recesses, wherein the coupling projections and/or recesses corresponding to the first end section are arranged at a displacement of about 90° relative to the coupling projections and/or recesses corresponding to the second end section and the coupling member at least partially surrounds the first and second end sections, wherein the first and second end sections are disposed axially directly opposite to each other, and the coupling member is positionally fixed by the first and second end sections, wherein the coupling member has a substantially annular shape with an inner diameter of the coupling member being larger than an outer diameter of the first end section, the first end section being substantially cylindrical, and wherein a cross section of the second end section is shaped as a portion of a circle having a diameter larger than the inner diameter of the coupling member, the portion of a circle being formed by two parallel linear cut edges arranged radially opposite to a center of the second end section, and wherein the radially opposite, radially extending projections and/or recesses of the second end section include two recesses in a region of the outer surface of the circle.

* * * * *